United States Patent
Harrison

(10) Patent No.: US 11,979,093 B2
(45) Date of Patent: May 7, 2024

(54) RESONANT PARALLEL TRIPLE ACTIVE BRIDGE CONVERTER

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 37 days.

(21) Appl. No.: 17/939,315

(22) Filed: Sep. 7, 2022

(65) Prior Publication Data
US 2023/0077476 A1 Mar. 16, 2023

Related U.S. Application Data

(60) Provisional application No. 63/243,932, filed on Sep. 14, 2021.

(51) Int. Cl.
*H02M 7/48* (2007.01)
*H02M 1/00* (2006.01)
*H02M 7/5387* (2007.01)

(52) U.S. Cl.
CPC ....... *H02M 7/4815* (2021.05); *H02M 1/0029* (2021.05); *H02M 1/0043* (2021.05); *H02M 7/53871* (2013.01)

(58) Field of Classification Search
CPC ............. H02M 7/4815; H02M 1/0043; H02M 1/0029; H02M 7/53871
See application file for complete search history.

(56) References Cited

U.S. PATENT DOCUMENTS

| | | | |
|---|---|---|---|
| 5,198,970 A | 3/1993 | Kawabata et al. | |
| 8,670,254 B2 | 3/2014 | Perreault et al. | |
| 9,825,556 B2 * | 11/2017 | Rodriguez | H02M 7/493 |
| 9,960,712 B2 * | 5/2018 | Rodriguez | H02J 7/34 |
| 10,530,276 B2 * | 1/2020 | Rodriguez | H02M 7/4807 |
| 10,804,816 B2 * | 10/2020 | Harrison | H02J 7/345 |
| 2016/0285387 A1 | 9/2016 | Rodriguez et al. | |
| 2022/0103060 A1 * | 3/2022 | Chapman | H02M 7/44 |
| 2023/0015609 A1 * | 1/2023 | Harrison | H02M 1/0085 |

FOREIGN PATENT DOCUMENTS

CN 112019080 A 12/2020
JP 5958531 B2 8/2016

OTHER PUBLICATIONS

PCT International Search Report and Written Opinion for Application No. PCT/US2022/043421 dated Jan. 2, 2023, 11 pgs.

* cited by examiner

*Primary Examiner* — Adolf D Berhane
(74) *Attorney, Agent, or Firm* — MOSER TABOA

(57) ABSTRACT

A resonant parallel triple active bridge converter comprising a DC port configured to receive DC energy, an AC port configured to produce AC energy, and an AC line cycle energy storage port, coupled to both the DC port and the AC port, where the AC line cycle energy storage port comprises an energy storage device for storing energy during an energy conversion process.

19 Claims, 3 Drawing Sheets

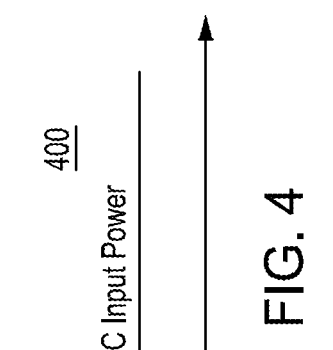
FIG. 4
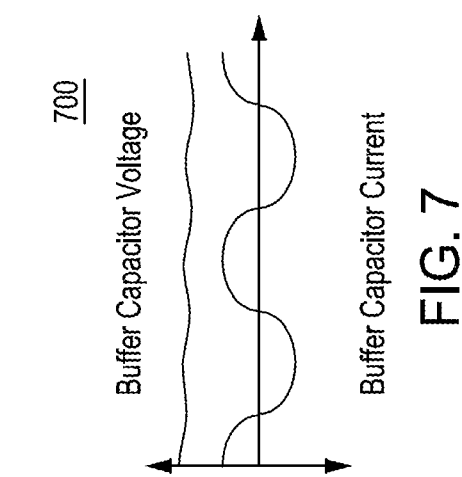
FIG. 7
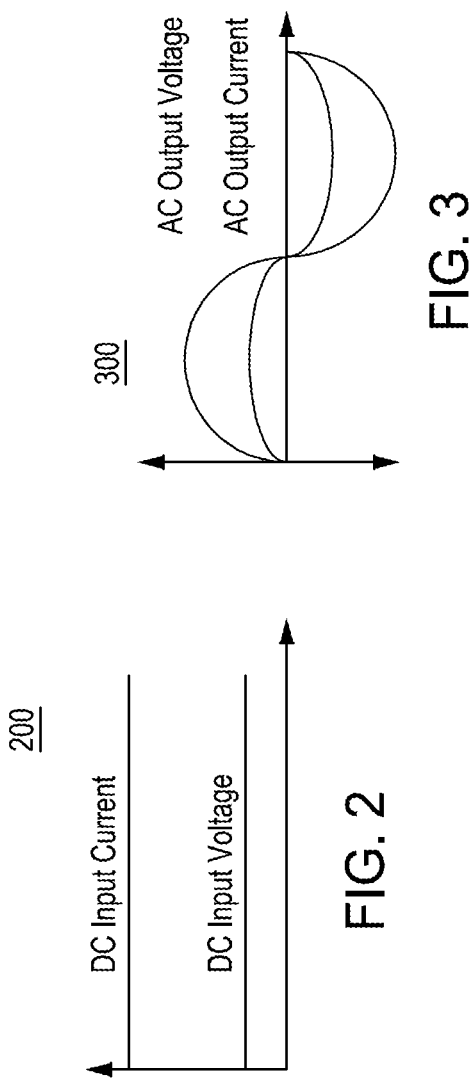
FIG. 3
FIG. 6
FIG. 2
FIG. 5

RESONANT PARALLEL TRIPLE ACTIVE BRIDGE CONVERTER

CROSS-REFERENCE TO RELATED APPLICATIONS

This application claims benefit of U.S. provisional patent application Ser. No. 63/243,932, entitled "RESONANT PARALLEL TRIPLE ACTIVE BRIDGE CONVERTER" and filed Sep. 14, 2021, which is herein incorporated in its entirety by reference.

BACKGROUND

Field

Embodiments of the present invention generally relate to power converters and, more specifically, to a resonant parallel triple active bridge converter.

Description of the Related Art

Currently available single phase microinverters utilize a single-phase series-resonant cycloconverter topology. Power conversion from the DC power provided by the photovoltaic (PV) module to the AC power that is fed to the utility power grid requires short term energy storage to match the constant power being provided by the PV module to the cyclic AC power that is delivered to the AC mains grid. This 'AC line cycle' energy storage function is provided by large electrolytic capacitors directly connected across the DC input of the microinverter. An example of such a microinverter is disclosed in commonly assigned U.S. Pat. No. 10,707,775, granted 7 Jul. 2020, (hereinafter referred to as the '775 patent) hereby incorporated by reference herein in its entirety.

These large electrolytic capacitors (typically, four) collectively occupy 20% of the total volume of the microinverter and are electronic components that have a known 'wear-out' mechanism which results in the need to use the highest quality (expensive) parts and provide considerable design margin to ensure the electrical stress is maintained at low enough levels for these capacitors to last the expected 25-year operational life of the microinverter. The location of the AC line cycle energy storage at the DC input of the microinverter results in significant RMS currents that must be handled by the entire power converter. As such, the high-power components of the microinverter are costly.

Therefore, there is a need in the art for an improved microinverter having storage capacitors that are not located at the DC input of the microinverter.

SUMMARY

Embodiments of the present invention comprise a resonant parallel triple active bridge converter is provided substantially as shown in and/or described in connection with at least one of the figures, as set forth more completely in the claims.

Features and advantages of the present disclosure may be appreciated from a review of the following detailed description of embodiments of the present invention, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a graph of the input port (C) DC voltage and DC current of the resonant parallel triple active bridge converter in accordance with at least one embodiment of the present invention;

FIG. 3 is a graph of the output port (A) AC voltage and AC current of the resonant parallel triple active bridge converter in accordance with at least one embodiment of the present invention;

FIG. 4 is a graph of the DC input power delivered to the resonant parallel triple active bridge converter in accordance with at least one embodiment of the present invention;

FIG. 5 is a graph of the AC output power supplied by the resonant parallel triple active bridge converter in accordance with at least one embodiment of the present invention;

FIG. 6 is a graph of an energy power buffer waveform of the resonant parallel triple active bridge converter in accordance with at least one embodiment of the present invention;

FIG. 7 is a graph of a capacitor waveform of the resonant parallel triple active bridge converter in accordance with at least one embodiment of the present invention.

DETAILED DESCRIPTION

Figure 1:
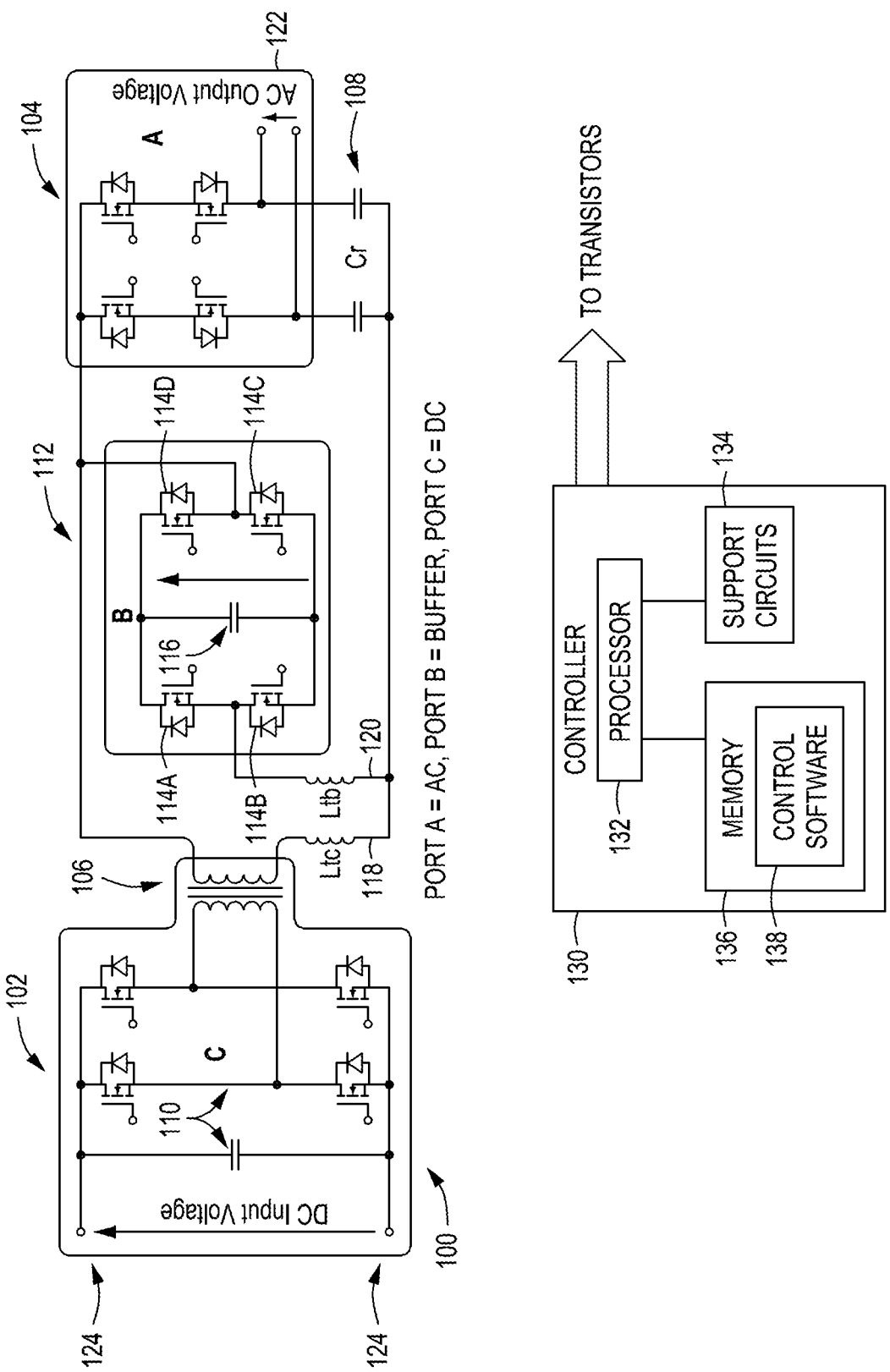
FIG. 1 is a schematic diagram of a resonant parallel triple active bridge converter in accordance with at least one embodiment of the present invention.

FIG. 1 depicts a schematic diagram of a resonant parallel triple active bridge converter 100 in accordance with at least one embodiment of the present invention. The DC (input) port (C) 102 (four transistor bridge circuit), the AC (output) port (A) 104 (a four-transistor bridge circuit), isolation transformer 106, and resonant capacitors (Cr) 108 are all effectively identical to their counterpart components described in the '775 patent. Although the DC (input) connection of the parallel triple active bridge converter 100 has a capacitor 110 for buffering the high frequency switching currents, the size of this capacitor is considerably smaller than the electrolytic capacitors previously used in the art, as capacitor 110 is not required to perform the AC line cycle energy storage function. In one exemplary embodiment, the capacitor 110 is 30 uF as compared to 13,000 uF in a conventional microinverter.

The resonant parallel triple active bridge converter 100 comprises a third port (B) 112 to perform the AC line cycle energy storage function. The AC line cycle energy storage port 112 uses a full-bridge configuration (e.g., four transistors 114A, 114B, 114C and 114D) with an energy storage device 116, such as a high voltage capacitor or capacitors, to perform the energy buffer function. Although embodiments of the invention described herein utilize a high voltage capacitor as the storage device, other energy storage devices may be used to perform the buffering function. The voltage rating on such a high voltage capacitor should be similar to the magnitude of the AC bridge voltage of port B 112. From a practical perspective, the voltage rating for the high-voltage capacitor used would be chosen to match the commonly available voltage rating for the FETs that are used in bridge circuit of the AC line cycle energy storage port 112. Based on this practical consideration, a power converter designed to connect to a 230 Vac/240 Vac AC mains grid would make use of FETs for the third port bridge with a voltage rating of 600V and hence the high voltage capacitor will be in the range of 350V to say 500V. If a version of this converter was designed to connect to a 480 Vac mains grid, then it is likely to use either 900V or 1,200V FETs for the third port bridge and therefore the high voltage capacitor is likely to have a voltage rating in the range of 700V to 1,000V.

In one embodiment, the capacitor 116 comprises at least one of ceramic capacitor, film capacitor, or an electrolytic capacitor—the energy density of the high voltage capacitor 116 is better than the energy density of the low voltage electrolytic capacitors currently used in the art. Additionally, the life expectancy of ceramic and film capacitors is considerably better than that for electrolytic capacitors since these ceramic and film capacitors do not have any significant 'wear-out' mechanism.

The resonant parallel triple active bridge converter 100 comprises two independent resonant inductors 118 and 120—the first $Lr_C$ 118 is connected to the DC (input) port C 102 and the second $Lr_B$ 120 is connected to the AC line cycle energy storage port B 112. In an exemplary embodiment, the two inductors 118 and 120 may be implemented on a single magnetic core with two separated windings providing a loose magnetic coupling (high leakage inductance between the windings), as these resonant inductors do not need to be completely independent.

The control of the triple active bridge converter 100 is similar to the control of the microinverter described in the '775 patent. A controller 130 provides timed control signals to the transistors of the resonant parallel triple active bridge converter 100. The controller 100 may comprise at least one processor at least one processor 132, support circuits 134, and memory 136. The at least one processor 132 may be any form of processor or combination of processors including, but not limited to, central processing units, microprocessors, microcontrollers, field programmable gate arrays, application specific integrated circuits, graphics processing units, and the like. The support circuits 134 may comprise well-known circuits and devices facilitating functionality of the processor(s). The support circuits 134 may comprise one or more of, or a combination of, power supplies, clock circuits, communications circuits, cache, transistor drivers, phase lock loop circuits, and/or the like.

The memory 136 comprises one or more forms of non-transitory computer readable media including one or more of, or any combination of, read-only memory or random-access memory. The memory 136 stores control software 138 comprising computer instructions to control the transistors of the resonant parallel triple active bridge converter 100 to facilitate operation as described below.

Operation of the resonant parallel triple active bridge converter 100 can best be understood using superposition theory and considering two orthogonal control mechanisms:

1. DC→AC power transfer control: If the four transistors of the AC line cycle energy storage port B 112 are switched (i.e., activated and deactivated) in phase with the four transistors of the DC input port C 102, then there will be no energy transfer into or out of the AC line cycle energy storage capacitor 116. With these two port bridges being switched in phase with each other, they effectively act like the DC input port of the '775 patent. In this mode of operation, the switching frequency can be used as the control mechanism to control the rate of energy transfer from the DC input port C 102 to the AC output port A 104.

2. Buffer power transfer control: If a phase shift is introduced between the drive of the four transistors of the DC input port C 102 and the drive of the four transistors of the AC line cycle energy storage port B 112, then this phase shift controls the energy transfer into or out of the capacitor 116. The difference between a leading or lagging phase shift determines the direction of power flow—power will flow from the leading bridge to the lagging bridge, and the amount of phase shift between the drive of these two bridges determines the amount of power flow.

Since the triple active bridge converter 100 is a linear system, then superposition theory can be applied resulting in these two control mechanisms being independent and orthogonal to each other. This allows for the energy conversion function of the converter 100 to be controlled independently of controlling the correct AC line cycle energy storage function to ensure that the converter 100 delivers a low distortion sinewave current to the AC output terminals 122 while ensuring a low ripple DC current is drawn from the DC input terminals 124.

The ideal operational analysis (assuming 100% conversion efficiency) is based on the requirement of conservation of energy—energy can be transferred from any one port to any of the other two ports and the total sum of energy flowing into (or out of) of the three ports must always sum to zero—energy is not created or destroyed by the converter, rather it is simply transferred between the different ports. Considering the real-world effect of conversion losses only slightly changes this analysis, resulting in a net sum total input flow of energy to match the magnitude of the conversion losses.

FIG. 2 is a graph 200 of the input port (C) DC voltage and DC current—in one embodiment, the input port 102 may be connected to a solar PV module with the design characteristics of the PV module and solar irradiance determining the DC Voltage and DC current—with an objective of this converter to draw an optimal current from the PV module in order to operate the PV module at it's maximum power point by employing one of many standard Maximum Power Point Tracking (MPPT) algorithms.

FIG. 3 is a graph 300 of the output port (A) AC voltage and AC current—in one embodiment, this output port 104 may be connected to the AC mains grid. The AC grid would determine the AC voltage for this output port and a legislative requirement (AC Grid Harmonic Current Standards) for a grid tied PV inverter is for the AC current being fed into the grid is sinewave profiled. The control of this 3-port converter 100 is responsible for providing the control to ensure the AC current is profiled into this sinewave current, with the frequency matching that of the AC mains voltage. The converter control is also responsible for determining the correct magnitude for the AC output current—the requirement here is to ensure the input and output energy is matched (exactly if conversion losses are ignored) over a single AC mains period.

FIG. 4 is a graph 400 of the DC input power delivered (from the solar PV module) into the 3-port converter. This graph 400 is obtained by multiplying the instantaneous DC input voltage by the instantaneous DC input current waveforms. The integral area under this power waveform represents the energy delivered, with respect to time.

FIG. 5 is a graph 500 of the AC output power supplied (to the AC mains grid) from the 3-port converter. This graph 500 is obtained by multiplying the instantaneous AC output voltage by the instantaneous AC output current waveforms. The integral area under this power waveform represents the energy supplied, with respect to time.

The concept behind this 3-port converter 100 is to utilize the capacitor 116 connected to port (B) 112 to balance the difference between the instantaneous DC input power and the instantaneous AC output power. To achieve this goal, the total DC input power over an AC mains cycle must equal the total AC output power over the same AC mains cycle. In other words, the energy integral (i.e., the area under the graph) for FIG. 4 (DC input) and FIG. 5 (AC output) graphs must be equal. The 3-port converter control achieves this goal of making the input energy integral and output energy integral equal by controlling the magnitude of the sinewave AC output current waveform, i.e., generating the AC output current demand signal.

Conservation of energy dictates the waveform in the graph 600 of FIG. 6—the requirement is that the DC input power waveform (FIG. 4) added to the energy buffer power waveform (FIG. 6) must add up to the AC output power waveform (FIG. 5). The required energy buffer power waveform can be simply determined by subtracting the DC input power waveform from the AC output power waveform.

The capacitor 116 is maintained at a target DC voltage. The total energy in this capacitor 116 is given by the energy in a capacitor equation: $E=\frac{1}{2} CV^2$, where C is the capacitance of the capacitor and V is the voltage across the capacitor. The size (capacitance) of this capacitor 116 is chosen to ensure that it exceeds the amount of energy that needs to be stored over an AC mains cycle. As the amount of energy in the capacitor 116 changes in time over the AC mains cycle, the DC voltage across the capacitor will vary—this gives rise to a 'voltage ripple' which is shown in the capacitor voltage waveform shown in graph 700 of FIG. 7.

The 3-port converter controller 130 is responsible for determining the instantaneous current waveform that needs to be applied to the capacitor 116. The capacitor current waveform (FIG. 7) can be determined by dividing the instantaneous energy buffer power waveform (FIG. 6) by the instantaneous capacitor voltage waveform (FIG. 7). This calculation is based on the identity that: Power=Voltage× Current.

To ensure the long-term balance between input energy and output energy is maintained over several mains cycles, a capacitor voltage regulation control loop is used and implemented within the controller 130 of FIG. 1, e.g., as executable instructions within control software 138. The theory is that a long-term excess of energy causes the voltage across the capacitor 116 to rise over time, whereas a long-term deficit of energy causes the voltage across the capacitor to fall over time. The capacitor voltage regulation control loop aims to maintain the average voltage across the capacitor at a target value (e.g., 80% of its maximum voltage rating). This voltage regulation control loop may be implemented as an integral controller—as the voltage across the capacitor 116 increases above the target value then this control loop will demand the magnitude of the AC output current to increase and conversely, as the voltage across the capacitor 116 decreases below the target value then this control loop will demand the magnitude of the AC output current to decrease. The integral action of this control loop ensures a slow response that determines the required magnitude of the AC output current and does not impact the fundamental required sinusoidal current waveform profile. Such a control loop may be enabled in hardware or as a portion of the control software (138 in FIG. 1).

During initial start-up of the 3-port converter 100, the controller 130 diverts all of the input energy in order to quickly charge the capacitor 116 to its target voltage. During this start-up period, the controller 130 does not try to deliver any AC output current. Once the energy capacitor 116 is charged to its target voltage, then the controller 130 can start delivering AC output current.

Reactive power control for the AC output port can be achieved with this 3-port converter 100 using the above-described control technique. FIG. 3 shows the sinusoidal profiled AC output current in phase with the AC output current with achieves 'unity power factor'. If reactive power control is required, the 3-port converter controller 130 introduces a phase shift in the sinusoidal AC current reference signal which is used as the demand signal for the control of the AC output current. An advanced phase shift of the sinusoidal reference current results in a capacitive reactive output current being generated, whereas a retarded phase shift of the sinusoidal reference current results in an inductive reactive output current being generated.

The above description of this 3-port converter 100 and the associated control technique has been described with respect to an application as a solar PV inverter operating as a DC→AC converter. According to this application, the input and output voltages are determined by the PV module and AC grid voltages, while the DC input current is determined by the PV MPPT algorithm used to extract the maximum power from the PV module. The 3-port converter controller accordingly is responsible for determining the AC output current to keep the capacitor voltage regulated to the target value. The above-described control concepts may be applied to other applications using the converter in either DC→AC or AC→DC conversion mode. The specific application will determine three of the four I/O variables: input voltage, input current, output voltage, output current. The fourth I/O variable that is not determined by the application will become the control variable that the controller manipulates in order to maintain the regulation of the capacitor voltage. This fourth I/O control variable can be any of the four I/O variables: input voltage, input current, output voltage, output current and will be determined by the requirements of the specific 3-port converter application.

All the above description of how control of this 3-port converter 100 is achieved is based from the perspective of considering the current and voltage waveforms at the three ports of the converter. This level of control is the high-level power control (energy flow control). A lower level of control is inferred throughout this description of the control process. This lower level of control is achieved on the basis of this 3-port converter being a 'switched mode' power converter. In this exemplary embodiment, the underlying switched mode converter architecture (shown in FIG. 1) is a series resonant converter employing a resonant tank circuit comprising a pair of resonant capacitors Cr 108 and a pair of resonant inductors $Lr_B$ 120 and $Lr_C$ 118. The underlying resonant converter achieves galvanic isolation between the input and output ports by using a transformer 106 which also serves the purpose of matching a low DC input voltage to a high AC output voltage. The DC input and energy buffer ports 102 and 112 employ full-bridge configurations, whereas the AC output port 104 employs a half-bridge cycloconverter bridge (using two pairs of common Source connected MOSFETs). Variations of this converter could be derived by using different bridge configurations for each of the three ports. In other embodiments, the bridge configurations for any of the ports 102, 112 and 104 that may be considered include, but are not limited to: full-bridge, half-bridge, and push-pull. The low-level control of this 3-port converter is based on any existing industry standard control methods for switched-mode series resonant converters.

Control loops—in summary: the control of this 3-port converter 100 is based on several different control loops that all execute independently. In one embodiment, the control loops are generated through execution of instructions in the control software 138 by the processor 132. These control loops include:

MPPT—Maximum Power Point Tracking algorithm determines the DC input current demand signal in order to operate the solar PV module at a loading that produces the maximum output power for a given solar irradiance.

AC Mains PLL—A Phase Locked Loop (PLL) may be employed to lock onto the AC mains voltage and create an output signal in the form of a pure sinusoidal waveform (no harmonic distortion) with unity magnitude which will be used as the reference demand signal for the AC output current. The PLL output signal has a phase referenced to the AC mains voltage with the phase difference set according to the desired AC reactive power control. For unity power factor the PLL reference output is in phase with the AC mains voltage. For reactive power control, the PLL reference output is either phase advanced or phase retarded with respect to the AC mains voltage.

Capacitor Voltage Regulation—This control loop monitors the voltage across the capacitor and compares the voltage to a desired target voltage. Depending on the difference between the measured voltage and the target voltage, this control loop increases or decreases the magnitude value that is applied to the PLL output reference signal and used as the AC output current demand signal. This control loop employs an integral response such that the output magnitude value (applied to scale the PLL reference signal) slowly increases or decreases over time resulting in the control loop slowly driving the converter to the desired operating point.

Capacitor Current Demand—This control loop is responsible for generating the control demand signal for controlling the instantaneous current that flows into or out of the capacitor. This demand signal may be generated by dividing the instantaneous energy buffer power waveform (FIG. 6) by the instantaneous capacitor voltage (FIG. 7).

These four control loops are exemplary embodiments of the types of control loops that may be used to control a 3-port converter 100. There are many variations on how this control may be achieved. For example, the control may be simplified by removing the AC mains PLL and generating the AC output current reference signal based off the AC mains voltage waveform. There are also other algorithms that may be used to generate the capacitor current demand signal that avoid the requirement of implementing a computationally complex division operation.

Figure 8:
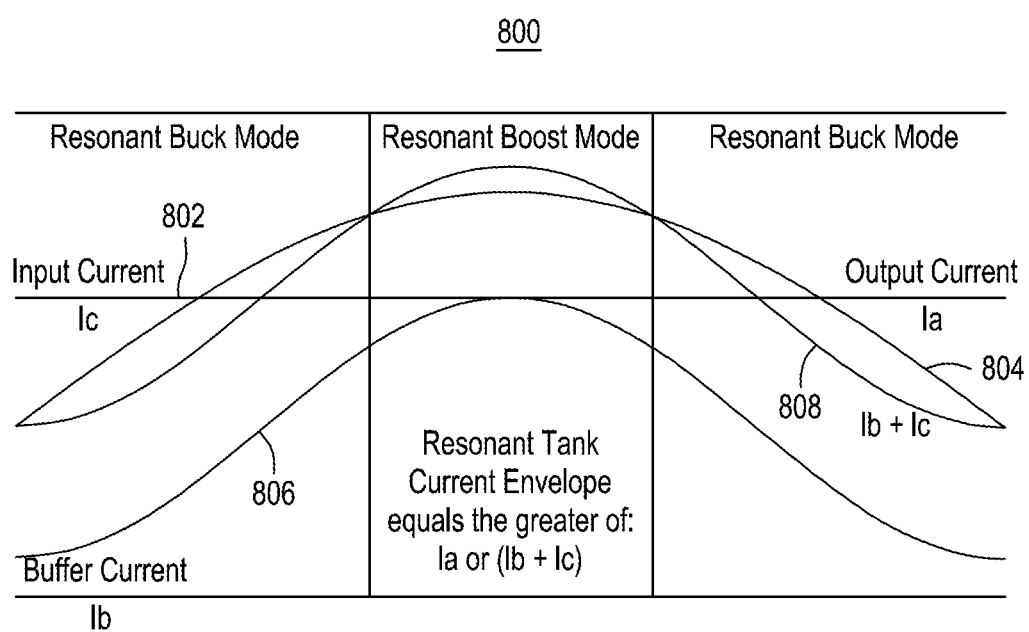
FIG. 8 is a graph of port currents generated by a simulation of the resonant parallel triple active bridge converter of FIG. 1 in accordance with at least one embodiment of the present invention.

FIG. 8 is a graph 800 of port currents generated by a simulation of the resonant parallel triple active bridge converter 100 of FIG. 1 over half an AC mains cycle. The DC input current 802 is constant across the half cycle of the output current 804. The buffer current is shown at 806 and the summation of the buffer current ($I_b$) and input current ($I_c$) is shown at 808.

Moving the location of the AC line cycle energy storage from the DC input to the AC output would reduce the RMS current through the power converter by 18%, which in turn would allow the power converter hardware to process 22% more power through an existing microinverter design.

In presently available microinverters, the input capacitance may comprise a mixture of ceramic capacitors (about 30 uF in total) which serve the purpose of buffering the high frequency switching current and electrolytic capacitors (about 13,000 uF in total) which serve the purpose of buffering the 120 Hz double line frequency (i.e., twice the AC mains frequency) current. In contrast, using a 3-port converter 100 of FIG. 1, it is possible to eliminate all of the input electrolytic capacitors. However, the ceramic capacitors would still be needed to buffer the switching frequency current. In one embodiment, the energy buffer block capacitor may comprise a high voltage electrolytic capacitor (e.g., about 450V rated) with a capacitance of approximately 75 uF. Although the total energy stored by this high voltage electrolytic capacitor is similar to the energy stored in the 13,000 uF input capacitors in presently available microinverters, the energy density and cost for a given energy storage for high voltage electrolytic capacitors is considerably more favorable than for low voltage electrolytic capacitors. As such, embodiments of the present invention provide a microinverter having lower cost and longer life expectancy than is presently available.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A resonant parallel triple active bridge converter comprising:
   a DC port configured to receive DC energy;
   an AC port configured to produce AC energy;
   an AC line cycle energy storage port, coupled to both the DC port and the AC port, where the AC line cycle energy storage port comprises an energy storage device for storing energy during an energy conversion process; and
   a controller configured to control an energy flow into and out of the energy storage device via determining an instantaneous current waveform that needs to be applied to the energy storage device such that the energy storage device balances a difference between an instantaneous DC input power and an instantaneous AC output power.

2. The resonant parallel triple active bridge converter of claim 1, where the AC port comprises a resonant cycloconverter half-bridge.

3. The resonant parallel triple active bridge converter of claim 2, where the resonant cycloconverter half-bridge comprises two pairs of common source connected transistors coupled to a resonant tank circuit.

4. The resonant parallel triple active bridge converter of claim 1, where the energy storage device comprises a high voltage capacitor.

5. The resonant parallel triple active bridge converter of claim 3, where the high voltage capacitor comprises at least one of a ceramic, film or electrolytic capacitor.

6. The resonant parallel triple active bridge converter of claim 1, where the AC line cycle energy storage port has a full-bridge configuration comprising four transistors.

7. The resonant parallel triple active bridge converter of claim 1, where the DC port has a full bridge configuration comprising four transistors and a transformer couples the DC port to the AC line cycle energy storage port.

8. The resonant parallel triple active bridge converter of claim 1, wherein the controller is further configured to switch transistors of the DC input port, the AC output port, and the AC line cycle energy storage port to control energy transfer through the resonant parallel triple active bridge converter.

9. The resonant parallel triple active bridge converter of claim 8, where the controller is further configured to introduce a phase shift when switching the transistors of the DC input port and the AC line energy storage port to control the direction of energy flow through the resonant parallel triple active bridge converter.

10. The resonant parallel triple active bridge converter of claim 8, where the controller is further configured to vary a switching rate of the transistors to control the rate of energy transfer through the resonant parallel triple active bridge converter.

11. A method of controlling a resonant parallel triple active bridge converter comprising a DC port configured to receive DC energy, an AC port configured to produce AC energy, an AC line cycle energy storage port, coupled to both the DC port and the AC port, where the AC line cycle energy storage port comprises an energy storage device for storing energy during an energy conversion process, and a controller configured to control an energy flow into and out of the energy storage device, the method comprising:
   determining an instantaneous current waveform that needs to be applied to the energy storage device for controlling the energy storage device to balance a difference between an instantaneous DC input power and an instantaneous AC output power;
   controlling a switching rate of a plurality of transistors with the DC port, the AC port and the AC line cycle energy storage port to control the rate of energy transfer through the resonant parallel triple active bridge converter; and
   controlling a switching phase of transistors with the DC port, the AC port and the AC line cycle energy storage port to control the direction of energy transfer through the resonant parallel triple active bridge converter.

12. The method of claim 11, wherein controlling the switching rate controls energy transfer into and out of the energy storage device.

13. The method of claim 11, wherein an amount of phase shift controls an amount of power flow through the resonant parallel triple active bridge converter.

14. A resonant parallel triple active bridge converter comprising:
   a DC port configured to receive DC energy has a full bridge configuration;
   an AC port configured to produce AC energy comprising a resonant cycloconverter half-bridge;
   an AC line cycle energy storage port, coupled to both the DC port and the AC port, where the AC line cycle energy storage port has a full bridge configuration and comprises a high voltage capacitor for storing energy during an energy conversion process; and
   a controller configured to switch transistors of the DC input port, the AC output port, and the AC line cycle energy storage port to control energy transfer through the resonant parallel triple active bridge converter, and to determine an instantaneous current waveform that needs to be applied to the high voltage capacitor such that the high voltage capacitor balances a difference between an instantaneous DC input power and an instantaneous AC output power.

15. The resonant parallel triple active bridge converter of claim 14, where the resonant cycloconverter half-bridge comprises two pairs of common source connected transistors coupled to a resonant tank circuit.

16. The resonant parallel triple active bridge converter of claim 14, where the high voltage capacitor comprises at least one of a ceramic, film or electrolytic capacitor.

17. The resonant parallel triple active bridge converter of claim 14, where the full bridge configuration of the AC line cycle energy storage port comprises four transistors.

18. The resonant parallel triple active bridge converter of claim 14, where the full bridge configuration of the DC port comprises four transistors and a transformer couples the DC port to the AC line cycle energy storage port.

19. The resonant parallel triple active bridge converter of claim 14, where the controller is configured to introduce a phase shift when switching the transistors of the DC input port and the AC line energy storage port to control the direction of energy flow through the resonant parallel triple active bridge converter and to vary a switching rate of the transistors to control the rate of energy transfer through the resonant parallel triple active bridge converter.

* * * * *